(No Model.)

J. A. TILDEN.
ROTARY FLUID METER.

No. 457,295. Patented Aug. 4, 1891.

Witnesses:
A. F. Macdonald.
J. W. Dolan

Inventor
James A. Tilden
by his attys
Clarke & Raymond

UNITED STATES PATENT OFFICE.

JAMES A. TILDEN, OF HYDE PARK, MASSACHUSETTS, ASSIGNOR TO THE HERSEY METER COMPANY, OF PORTLAND, MAINE.

ROTARY FLUID-METER.

SPECIFICATION forming part of Letters Patent No. 457,295, dated August 4, 1891.

Application filed December 24, 1888. Serial No. 294,510. (No model.)

*To all whom it may concern:*

Be it known that I, JAMES A. TILDEN, of Hyde Park, in the county of Norfolk and State of Massachusetts, a citizen of the United States, have invented a new and useful Improvement in Fluid-Meters, of which the following is a full, clear, and exact description, reference being had to the accompanying drawings, forming a part of this specification, in explaining its nature.

The invention is an improvement upon the meter described in my patent, reissue No. 10,778, dated November 2, 1886. The invention described in said patent comprises a peculiar form of piston-chamber, piston, and exhaust-ports, the piston being held or confined between two stationary port-plates and the ports being disposed to close the fluid-pressure upon each end of the piston, so that the friction thereon is reduced to a minimum; or, in other words, the piston is balanced.

In this invention I employ a piston-chamber of the same form as those described in said patent. The ring forming the piston-chamber, however, is enough smaller than the meter-case as to provide a channel or passage about it, and the piston is attached to one of the port-plates, and the porting of the fluid does not exert a balancing effect upon the ends of the piston.

Figure 1:
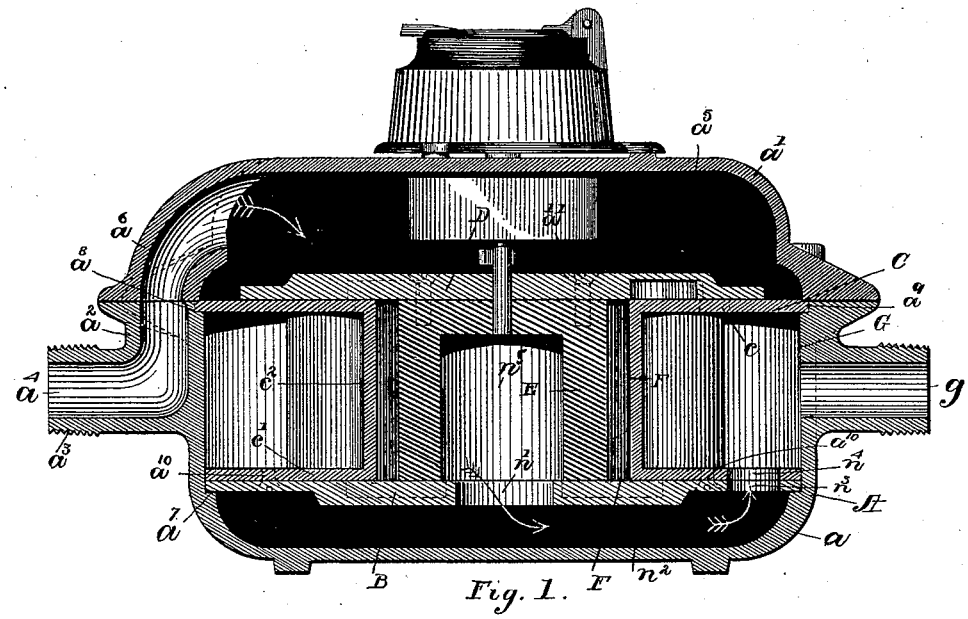
Figure 2:
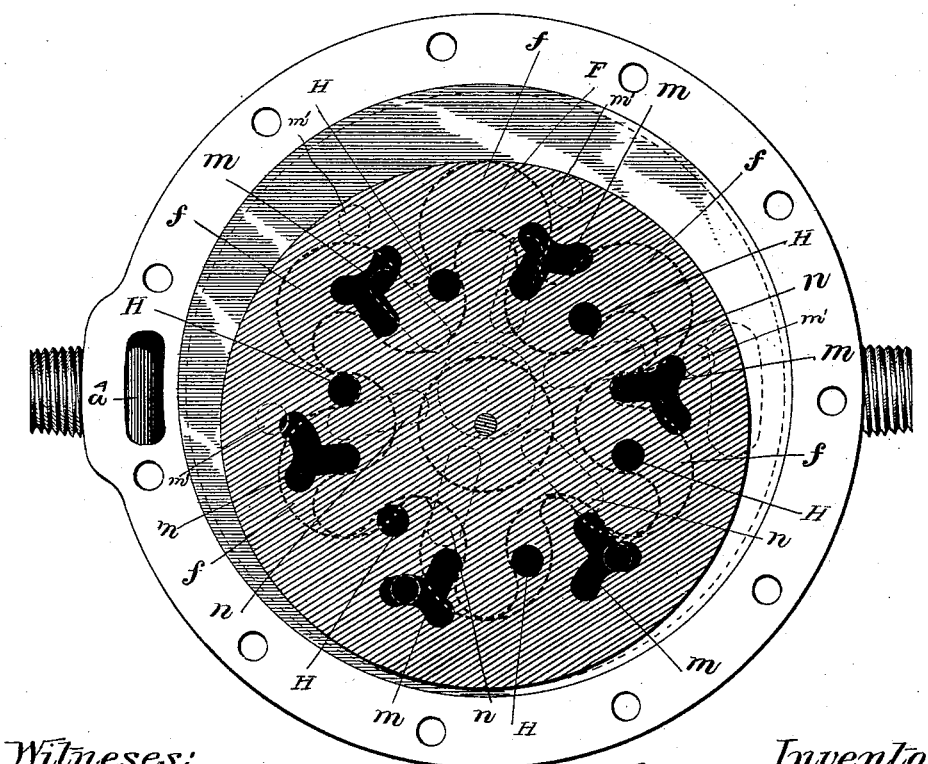

In the drawings, Figure 1 is a view, principally in vertical central section, of a meter having the features of my invention; and Fig. 2 is a view, partly in plan and partly in horizontal section, taken through the upper port-plate to further illustrate the same.

A is the piston-case. It is made of iron, preferably galvanized, or any other suitable metal, and is formed in two parts, $a$ the main section, and $a'$ the cap, the cap $a'$ being attached to the main section by bolts or screws. The interior of this case is cylindrical. There is formed upon side of the case the offset $a^2$, ending in a threaded nozzle or coupling $a^3$, in which is the inlet $a^4$. This inlet is represented as extending into the cavity $a^5$ of the case through a hole or passage, forming a continuation thereof, formed in the offset $a^6$ of the cap. The section $a$ of the case has the lower shoulder $a^7$, upon which the lower port-plate B rests, and the upper shoulder $a^8$, upon which a projecting part $a^9$ of the ring C, forming the piston-chamber, extends. The lower port-plate B is stationary and secured to the ring by screws $a^{10}$.

D is the upper port-plate. It is secured to the piston E by screws $a^{11}$ to rotate or turn therewith. The ring C forms the piston-chamber F, having the measuring spaces or recesses $f$. It is preferably made of hard or vulcanized rubber or rubber compound, and in addition to forming the piston-chamber it is also shaped to form an exterior chamber or passage, which is in fact an outlet-passage, and which is separated or divided from the inlet of the meter by the division-plate $c$, which preferably is formed integral with the remainder of the ring C. The ring as whole comprises the plates or sections $c$ $c'$ and the vertical wall $c^2$.

I have represented the meter as porting through both port-plates B D in the following way: The fluid enters the measuring-spaces through the holes H in the upper port-plate D, fills the various measuring spaces or recesses $f$ in successive order, according as the movement of the piston causes them to be uncovered. The fluid then flows or escapes from these measuring spaces or recesses by means of the ports $m$ in the upper plate, which are brought by the movement of the piston to connect with holes $m'$, formed in the division-plate $c$ of the ring. These ports $m$ are recesses in the under surface of the top port-plate D, and they preferably are formed as represented in Fig. 2—that is, they have a curved section and a straight section, which enters the curved section about one-third of its length from one end. They are formed so as to provide a fluid-escape passage from each of the measuring spaces or recesses to each hole $m'$, but not to all the holes at the same time, the connections being made as the piston is moved, and being progressive—that is, one after another in continuous order in one direction. This provides an escape for the fluid from the measuring spaces or recesses into the passage or chamber G about the ring. The fluid is also represented as escaping from the measuring-spaces $f$ through the escape-ports $n$ in the lower or stationary port-plate B, (represented in dotted outline in Fig. 2,) and these ports are recessed in the upper surface of the plate B and are shaped as represented in Fig. 2—that is, they are radially arranged in relation to the center of the plate and are practically rectangular in form, their longest diameter being on the radial line. They serve to connect the measuring spaces or recesses $f$ in successive or progressive order, according as the piston E is moved with the chamber or fluid-way $n^5$ in the center of the piston E and the hole $n'$ in the lower port-plate, the fluid escaping through said hole $n'$ into the passage $n^2$ in the base of the case $a$, and thence through a hole $n^3$ in the lower port-plate and a hole $n^4$ in the plate $c'$ of the ring into the chamber or passage G, from which the outlet $g$ extends. (See Fig. 1.)

To use this form of organization in this class of fluid-meter, I have ascertained that it is essential that the area of the escape-port leading from the various measuring-chambers $f$ be equal to or preferably greater than the area of the holes or passages by which the fluid is supplied to these chambers, and when the exhaust-ports and inlets bear this differential relation to each other that it answers practically the same purpose as the balancing of the piston by equalizing the end pressure of water thereon, described in my said patent, and that the piston and the upper port-plate attached to it rotate with very little, if any, friction when the action of the meter is satisfactory; and I would here remark that, so far as this feature of my invention is concerned, the exhaust-ports may be located in only one of the port-plates, provided the exhaust-port of each measuring recess or chamber is made as large or preferably larger in area than the inlet-passage of each measuring recess or chamber, and when the ports in the lower plate are not used the said plate may be secured to the piston to turn with it. The piston is connected with the registering mechanism in any desired way. The piston preferably is made of hard or vulcanized rubber, the upper port-plate of hard rubber, and the lower port-plate of brass.

At first sight it would appear that certain features of the invention herein described are found in my patents, No. 380,669, dated April 3, 1888, and No. 353,833, dated December 7, 1886; but these patents do not describe an unbalanced piston—that is, a piston in which there is an excess of water-pressure against one head or end thereof—neither do they describe a construction in which the area of the escape-ports is greater than the area of the inlet-ports.

Having thus fully described my invention, I claim and desire to secure by Letters Patent of the United States—

In a fluid-meter, the combination of a ring having measuring spaces or recesses $f$, the piston E, the chamber or passage G about the ring, the division-plate $c$, having the holes $m'$, and the port-plate D, attached to the piston, and having the inlet-ports H and ports $m$, connecting with the said chamber or passage G, and the port-plate B, having the ports $n$, and escape-passages extending from said ports to the outlet, whereby the measuring-chambers receive fluid under pressure through the ports H and discharge it partly through the annular chamber about the piston and partly through the center of the piston, substantially as described.

JAMES A. TILDEN.

In presence of—
F. F. RAYMOND, 2d,
J. M. DOLAN.